Figure 1:
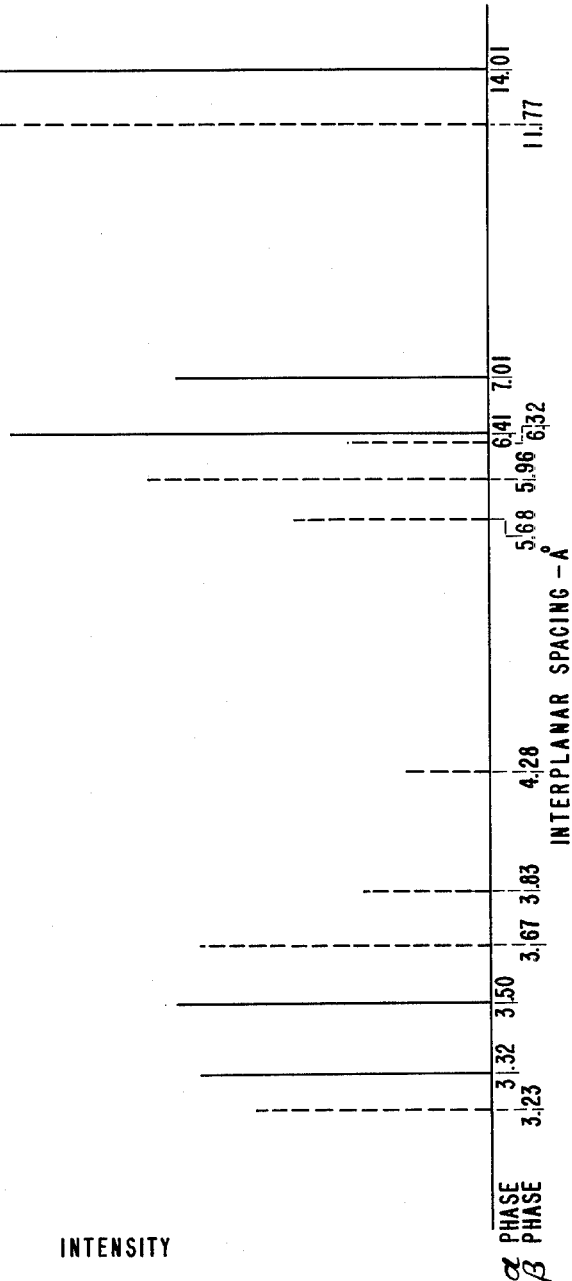

Nov. 7, 1961

C. W. MANGER ET AL 3,007,930

BETA-PHASE DIHYDROQUINACRIDONE AND PROCESS

Filed Jan. 24, 1958

2 Sheets-Sheet 1

X-RAY PATTERN
—— ALPHA PHASE DIHYDROQUINACRIDONE
---- BETA PHASE DIHYDROQUINACRIDONE

INVENTORS
CHARLES W. MANGER
FELIX FREDERICK EHRICH

BY Francis J. Crowley
ATTORNEY

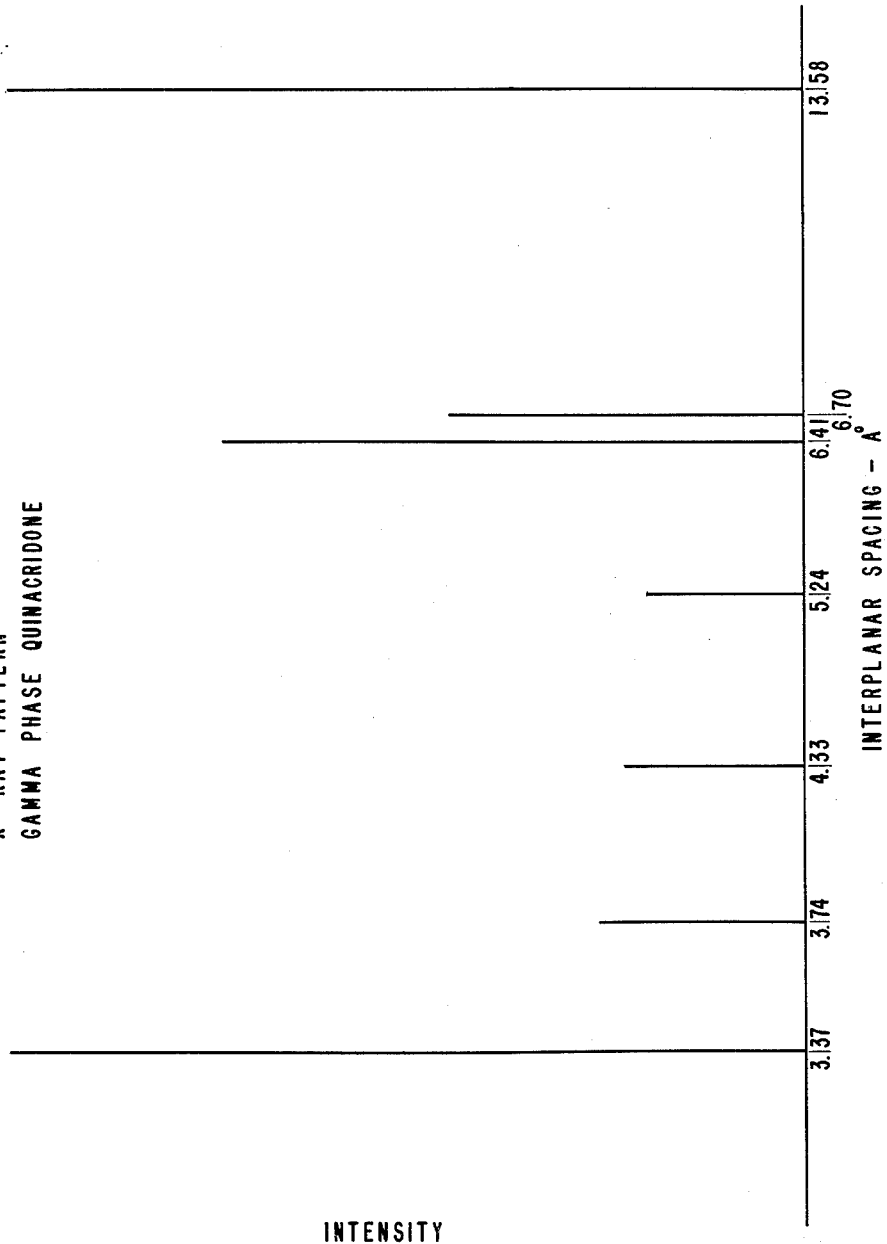

United States Patent Office 3,007,930
Patented Nov. 7, 1961

3,007,930
BETA-PHASE DIHYDROQUINACRIDONE
AND PROCESS
Charles W. Manger, Irvington, and Felix Frederick Ehrich, Westfield, N.J., assignors to E. I. du Pont de Nemours and Company, Wilmington, Del., a corporation of Delaware
Filed Jan. 24, 1958, Ser. No. 711,020
8 Claims. (Cl. 260—279)

This invention relates to dihydroquinacridone in a new crystal phase.

A process for preparing dihydroquinacridone is described in U.S. Patent 2,821,529, and it involves the cyclization of a dialkyl 2,5-diarylamino-3,6-dihydro-terephthalate by heating the latter compound in an inert, high-boiling liquid. The reaction, which may be referred to as either a cyclization or a pyrolysis reaction, may be illustrated by the following equation:

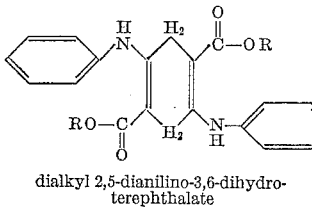

dialkyl 2,5-dianilino-3,6-dihydro-terephthalate

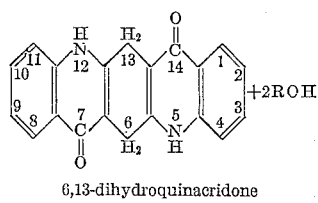

6,13-dihydroquinacridone 6,13-dihydroquinacridone, or simply dihydroquinacridone as it is more often called, is useful in the production of quinacridone pigments as more fully described in the application referred to above. The present invention concerns dihydroquinacridone in a new and useful crystal phase which has been designated the beta crystal phase. A copending, commonly assigned application Ser. No. 711,021, filed January 24, 1958, is directed to the alpha crystal phase.

It is therefore an object of this invention to prepare a new and useful crystal phase of the compound known as dihydroquinacridone. It is a further object of this invention to provide novel processes for the preparation of this new crystal phase. A still further object is to provide a method of converting this new form of dihydroquinacridone to quinacridone of a desired crystal phase.

Referring to the accompanying drawings, FIG. 1 shows the characteristic X-ray diffraction patterns for beta and alpha crystal phase dihydroquinacridone. FIG. 2 shows the characteristic X-ray diffraction pattern for gamma crystal phase quinacridone—a product which may be produced from the material of this invention. The horizontal axis of the graph shows the interplanar spacings of the crystal, and the vertical axis is an approximation of the realtive intensities. As dashed lines of FIG. 1 show, beta crystal phase dihydroquinacridone has an X-ray diffraction pattern in which the strongest line corresponds to an interplanar spacing of 11.77 A.; in which there are 4 relatively strong lines corresponding to interplanar spacings of 5.96 A., 5.68 A., 3.67 A., and 3.23 A. as well as three weaker lines with interplaner spacings of 6.32 A., 4.28 A. and 3.83 A. The X-ray diffraction pattern for the alpha phase is shown by the solid lines in FIG. 1 of the drawing. The X-ray diffraction patterns presented in this specificaiton are based on the conventional powder technique using the Cu K-alpha radiation with the diffraction intensity being recorded with a Geiger counter as a curve in which the horizontal axis shows the angle of diffraction and the vertical axis shows the intensity of the diffraction. For purposes of record, the angle of diffraction has been converted by the use of standard tables to interplanar spacings in Angstrom units which are independent of instrument variations. The values given are accurate to within 2%, and in most cases, variation is less than 1%. Therefore, cognizance should be taken of the variance when interpreting the specification and the claims.

Beta crystal phase dihydroquinacridone as produced in this invention is a light-colored substance of a pale salmon to pinkish shade. It is insoluble in aqueous alkali even at alkali concentrations of 10–20%. It is also insoluble in water, dilute mineral acids, alcohol, acetone, acetic acid and hydrocarbon solvents. It is slightly soluble in alcoholic alkali; and it is completely soluble in concentrated sulfuric acid to give a yellowish to reddish brown solution. Dilution of the solution with water reprecipitates the dihydroquinacridone in the alpha crystal phase.

The beta crystal phase dihydroquinacridone of this invention can be easily converted to a quinacridone pigment having high tinctorial value and excellent resistance to acids, alkali and organic solvents by a simple oxidation which removes hydrogen atoms in the manner indicated below:

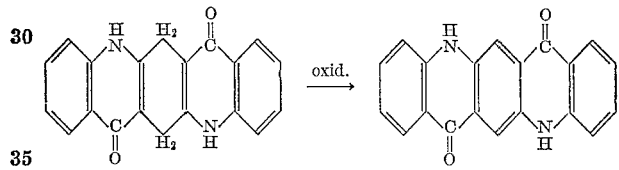

A particularly significant characteristic of beta crystal phase dihydroquinacridone is that this weak colored material can be oxidized in a medium which has no appreciable solvent effect upon the material to produce gamma crystal phase quinacridone—an intensely colored material exhibiting an X-ray diffraction pattern shown in FIG. 2. This pattern is characterized by three strong lines with interplanar spacings of 13.58 A., 6.41 A. and 3.37A. and four relatively weaker lines having interplanar spacings of 6.70 A., 5.24 A., 4.33 A. and 3.74 A. For example, the beta phase dihydroquinacridone is suspended in a solution containing water, a polar water soluble solvent, such as a lower alcohol, and an alkali, such as sodium hydroxide, in such proportions that there is no observable solubility. It is then subjected under conditions of reflux to a mild oxidizing agent such as nitrobenzene-m-sodium sulfonate, whereby the dihydroquinacridone is oxidized to quinacridone in the gamma crystal phase. This oxidation is shown in Examples IV–VI below.

The preparation of beta crystal phase dihydroquinacridone is accomplished by heating a dialkyl 2,5-dianilino-3,6-dihydroterephthalate containing from 1–3 carbon atoms in the alkyl group in a polar, high-boiling liquid or heat transfer medium which is free of active hydrogen atoms and which exerts some solvent action on the dihydroquinacridone. The heating is carried out in the absence of oxygen at temperatures in the range of 225–300° C., and preferably 250–260° C. for a period ranging from ¾ of an hour to 3 hours, and preferably about 1 hour. A particularly suitable heat transfer medium for carrying out the reaction is tetramethylene sulfone.

Another convenient way to prepare the beta phase dihydroquinacridone of this invention is to subject the alpha phase dihydroquinacridone to the action of a relatively strong solution of an alkali such as sodium hydroxide in a mixture of water and an alcohol. This results in a partial solution of the dihydroquinacridone as its sodium salt, thus allowing a recrystallization to occur. The resulting slurry is hydrolyzed by dilution with a relatively large amount of water. The product resulting from these two steps is in the new beta crystal phase. This method of preparing the beta crystal phase is preferred since the diluted slurry which is obtained can be directly used in the step of oxidizing the beta dihydroquinacridone to gamma crystal phase quinacridone. The addition of an oxidizing agent such as nitrobenzene-m-sodium sulfonate to the slurry, followed by refluxing, produces gamma phase quinacridone.

Another way to prepare this product is to subject alpha phase dihydroquinacridone to action of a solvent such as dimethyl formamide at the boiling point. Such a process also results in the conversion of the alpha phase dihydroquinacridone to the new beta crystal phase.

For a clearer understanding of the invention, the following specific examples are given. These examples are intended to be merely illustrative of the invention and not in limitation thereof. Unless otherwise specified all percentages and parts are by weight.

EXAMPLE I 10 parts of diethyl 2,5-dianilino-3,6-dihydro-terephthalate and 40 parts of tetramethylene sulfone are heated to about 250° C. for 1 hour in an atmosphere of nitrogen. The charge is cooled below 100° C., diluted with water in which the tetramethylene sulfone is soluble and the product is isolated by filtration and washing with water and drying. The pale salmon to pinkish material obtained is beta crystal phase dihydroquinacridone exhibiting a new X-ray diffraction pattern in which the strongest line corresponds to an interplanar spacing of 11.77 A, in which there are four relatively strong lines corresponding to interplanar spacings of 5.96 A, 5.68 A, 3.67 A and 3.23 A and three weaker lines with interplanar spacings of 6.32 A, 4.28 A and 3.83 A. When subsequently oxidized under the selected conditions shown in Example IV, it gives gamma crystal phase quinacridone having an X-ray diffraction pattern as shown in FIG. 2.

EXAMPLE II

Alpha crystal phase dihydroquinacridone is prepared by introducing 49.6 parts of diethyl 2,5-dianilino-3,6-dihydro-terephthalate in 250 parts of a mixture comprising 23.5% biphenyl and 76.5% diphenyl oxide. The mass is then heated for 1 hour while maintaining an atmosphere of nitrogen gas in the reaction vessel. The charge is cooled to room temperature and diluted with about 100 parts of denatured ethyl alcohol and the alpha crystal phase dihydroquinacridone is recovered by filtering and washing with ethyl alcohol. 40 parts of the alpha crystal phase dihydroquinacridone thus obtained is wet-up with a mixture of 320 parts of methanol and 93 parts of water. 18 parts of sodium hydroxide is then added and the mixture is stirred vigorously for about 1.5 hours. It is then diluted rapidly with 125 parts of water and the slurry is stirred for a brief time while neutralizing to a pH of about 7.0 with dilute hydrochloric acid. The solid is isolated by filtration, washing and drying. It is a pale salmon colored material exhibiting the X-ray diffraction pattern of the beta crystal phase dihydroquinacridone as shown in FIG. 1.

EXAMPLE III 10 parts of alpha phase 6,13-dihydroquinacridone made as in Example II is placed in a suitable vessel equipped for agitation and fitted with a reflux condenser. 1000 parts of dimethyl formamide is then added to the vessel and the mixture is heated to reflux (about 153° C.) and maintained at this temperature with agitation for several hours. The solid is then filtered from the liquid and dried to give a crystalline powder exhibiting the X-ray diffraction pattern of beta crystal phase dihydroquinacridone. Dimethylsulfoxide may be used in this preparation in place of dimethylformamide.

EXAMPLE IV 100 parts of beta phase dihydroquinacridone as made in Example II is wet-up with a mixture of 800 parts methanol in 560 parts water to which 45 parts of sodium hydroxide is then added. The slurry is heated to the boil under good agitation and a solution of 75 parts nitrobenzene-m-sodium sulfonate in 250 parts of water is then added rapidly and stirring continued under conditions of reflux for 3–5 hours. Finally, the slurry of bright red pigment is diluted with about 5000 parts of water, filtered, washed free of soluble salts and dried to give a crude pigment exhibiting the characteristic X-ray diffraction lines of the gamma crystal phase of quinacridone as shown in FIG. 2.

This method of obtaining the gamma phase of quinacridone is a solid phase oxidation of beta phase dihydroquinacridone. Equivalent results may be obtained by this procedure when the beta phase dihydroquinacridone is prepared by other methods.

EXAMPLE V

In a process substantially similar to that of Example IV, the following mixtures of ingredients behave as solid phase oxidations and yield gamma phase quinacridone when the starting material is beta phase dihydroquinacridone:

|  | Ethanol | n-propanol | Monoethyl ether of ethylene glycol |
| --- | --- | --- | --- |
| dihydroquinacridone (beta phase) | 100 | 100 | 100 |
| water | 673 | 1,130 | 1,540 |
| sodium hydroxide | 30 | 65 | 100 |
| solvent | 400 | 480 | 1,115 |

EXAMPLE VI

*Conversion of beta dihydroquinacridone and oxidation to gamma quinacridone without intermediate isolation*

100 parts of 6,13-dihydroquinacridone as made in Example II is wet-up with a mixture of 800 parts methanol and 240 parts of water. 45 parts of sodium hydroxide is then added. The mixture is stirred vigorously for about 1.5 hours and then diluted rapidly with about 320 parts of water. The slurry is then heated to the boil and stirred for a few minutes under reflux, following which a solution of 75 parts of nitrobenzene-m-sodium sulfonate in 250 parts of water is added rapidly and stirring under conditions of reflux is continued for 3–5 hours. Finally, the slurry of bright red pigment is diluted with about 5000 parts of water, filtered, washed free of soluble salts and dried to give a bright red pigment exhibiting the characteristic X-ray diffraction lines of the gamma crystal phase of quinacridone as shown in Example IV. When examined by the Emmett nitrogen absorption method this pigment exhibits a specific surface area of about 25–30 square meters per gram. It has a relatively opaque masstone when dispersed in an enamel vehicle, and such an enamel yields a highly desirable brilliant red finish of exceptional lightfastness, durability to the elements and freedom from bleeding in organic solvents.

The conversion of alpha phase dihydroquinacridone to the beta phase appears to be a conversion from a less stable crystal form (the alpha phase) to a more stable crystal form (the beta phase) through the influence of solvent action on the less stable form. To be more specific, the liquid phase in which the transformation takes place must exert sufficient solvent power on the alpha phase dihydroquinacridone to permit thermodynamic equilibrium to be attained between the material in solution and the material which is crystallizing out as the beta crystal phase. This solvent action can take place during the cyclization reaction if the liquid used as the heat transfer agent exerts sufficient solubility on the alpha phase dihydroquinacridone. On the other hand, the alpha phase dihydroquinacridone may be prepared and isolated, and conversion to the beta phase can be accomplished by the action of organic solvents. The solubility of the dihydroquinacridone in the organic solvent does not have to be great to have conversion take place. High boiling oxygenated solvents of high solvency power exert the slight solvent action necessary to effect the phase change. For instance, dimethylformamide as used in Example III exerts sufficient solubility for complete thermodynamic equilibrium to be obtained, and the phase which exists after an appreciable period of time under the conditions of this example is the thermodynamically stable beta phase. Another effective solvent is dimethylsulfoxide. It is, of course, a simple matter for one skilled in the art to determine whether any specific solvent will exercise the desired influence.

As an alternative to the use of organic solvents for carrying out the phase change, one may use aqueous alcoholic alkali. In this procedure which is illustrated in Example II, the amount of alkali and the amount of alcohol are each fairly large in respect to the water present, and it is highly probable that the soubility actually occurs through a transformation of the dihydroquinacridone to its disodium salt which has appreciable solubility in the mixture so that thermodynamic equilibrium is attained. Finally, on dilution with water, any sodium salt remaining is hydrolyzed and the solvent power of the liquid is reduced so that complete crystallization to the beta phase occurs. The particular alkali used in this crystallization is not at all critical and any of the alkali metal hydroxides will function. Since sodium hydroxide is the most readily available of these materials, and since it is by far the most economical to use, it is the preferred agent. Nevertheless, other alkalies, such as lithium and potassium hydroxide, could be used. In the case of the alcoholic solvent used in this process, the principal limitation is that the alcohol must have appreciable solubility in water. Alcohols such as methanol, ethanol, and the propyl alcohols are examples of monohydric alcohols which may be used. Dihydroxy compounds, such as ethylene glycol, and the mono-ethers of such dihydroxy compounds also function in this recrystallization. In fact, experience indicates that any polar, water-soluble solvent stable to the action of strong alkali metal hydroxide solutions will function. To provide the necessary solubility for the phase change, the proportions of ingredients during the initial stirring period should be in the ratio of 100 parts of water
15 to 20 parts of alkali
300 to 400 parts of organic solvent.

To finally precipitate all of the beta phase dihydroquinacridone, water should be added so that the proportions of ingredients become 100 parts of water
Substantially less than 15 parts of alkali, usually 3 to 10 parts
Not more than about 150 parts of solvent, usually 35 to 100 parts.

The oxidation of beta crystal phase dihydroquinacridone to gamma crystal phase quinacridone, as shown in Examples IV, V and VI, is referred to as a "solid phase oxidation process" since the dihydroquinacridone does not have to have significant solubility in the reaction medium in order to produce the gamma phase end product. Examination under the microscope indicates that the size and shape of the particles do not change significantly during a solid state oxidation, the only observable difference under the microscope being the change in color as the red quinacridone product develops from the dihydroquinacridone. Since the environment for carrying out the oxidation reaction is a three-component system in which various alkali metal hydroxides and solvents may be used, the broadest limits as to the concentration of each component cannot be suitably described by numerical ranges. However, the microscopic examination disclosed above enables one skilled in the art to determine if conditions are suitable for the solid-phase oxidation. In carrying out the process, the water content of the alkali-water-solvent environment should be kept high or the alkali content kept low (preferably both) so that there is no perceptible solubility of the dihydroquinacridone in the mixture. The same alkalis and solvents which are noted above as useful for the crystal phase transformation may be used in the oxidation step. Suggested amounts for the alkali-water-solvent oxidizing environment to satisfy this condition are about 3–15 parts of alkali per 100 parts of water, and the alkali should not exceed 5% of the total liquid present; the solvent should be present in an amount of about 30 to 150 parts per 100 parts of water. Preferred amounts are about 5 to 10 parts of alkali per 100 parts of water, the alkali not exceeding about 5% based on the total liquid present, and the amount of solvent is about 35–100 parts per 100 parts of water.

The examples show the use of nitrobenzene m-sodium sulfonate as the agent for oxidizing beta crystal phase dihydroquinacridone to gamma phase quinacridone. Sodium polysulfide is another oxidizing agent which can be used in this operation, and it is known that air will result in oxidation of the dihydroquinacridone to quinacridone. If desired, one could use other oxidizing agents which are soluble in the mixture and sufficiently mild to avoid decomposition of the products. The amount of oxidizing agent required for this operation is not at all critical. In general, the optimum ranges between about 0.75 parts to 1 part per part of dihydroquinacridone but the requirement is largely one of economy rather than successful operation. Obviously, enough agent must be used to complete the oxidation, and this can be readily calculated. Excessive amounts are avoided only for reasons of economy.

The concentration of dihydroquinacridone in either the phase conversion mixture or the oxidation mixture is not critical and can vary over a wide range. Since complete solution is not necessary in either case, it is obvious that the liquid may function as a diluent and suspending medium for the solid dihydroquinacridone. It is preferable to use enough liquid to produce an easily stirrable mass, and as a practical matter, one should use at least an amount of liquid which would allow all the solid particles to come in contact with the liquid during a reasonable agitation period. A 10% concentration of dihydroquinacridone in either the phase conversion mixture or the oxidation mixture is a good concentration for practical operation, but it is not a limiting concentration in either direction.

Gamma crystal phase quinacridone can be prepared according to this invention, and used as a pigment in a coating composition without reduction in particle size. Example VI is illustrative of a procedure for preparing such a pigment. However, if a reduction in particle size is desired, any conventional procedure of particle size reduction may be used if one is not concerned about obtaining a crystal-phase change during the operation. However, when it is desired to reduce the particle size and maintain the same crystal phase, care should be used in the selection of procedures. A preferred and practical procedure for reducing particle size without danger of a change in crystal phase is that of U.S. Patent 2,816,114 to Ehrich and Stratton. In the process of this patent, particle size reduction is accomplished by high energy milling in the presence of a saturated solution of a water-soluble salt and a surface-active agent.

Since it is obvious that many changes and modifications can be made in the above-described details without departing from the nature and spirit of the invention, it is to be understood that the invention is not to be limited to said details except as set forth in the appended claims.

We claim:

1. As a composition of matter, beta crystal phase 6,13-dihydroquinacridone having the following structural formula

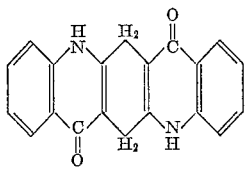

and characterized by an X-ray diffraction pattern exhibiting 5 strong lines of which the most intense corresponds to an interplanar spacing of 11.77 A., the remaining 4 strong lines corresponding to interplanar spacings of 5.96 A., 5.68 A., 3.67 A. and 3.23 A., and 3 weaker lines corresponding to interplanar spacings of 6.32 A., 4.28 A. and 3.83 A.

2. A process for preparing beta crystal phase dihydroquianacridone comprising contacting alpha crystal phase dihydroquinacridone with dimethylformamide, thereby converting the alpha crystal phase to the beta crystal phase of dihydroquinacridone.

3. A process for preparing beta crystal phase dihydroquinacridone comprising contacting alpha crystal phase dihydroquinacridone with dimethylsulfoxide, thereby converting the alpha crystal phase to the beta crystal phase of dihydroquinacridone.

4. A method for preparing beta crystal phase dihydroquinacridone comprising contacting alpha crystal phase dihydroquinacridone with a mixture of an alkali metal hydroxide, water, and a polar, alkali-stable, water-soluble organic solvent, the alkali metal hydroxide being present in amounts of about 15 to 20 parts per 100 parts of water, and the amount of organic solvent being 300–400 parts per 100 parts of water, and then diluting the slurry of dihydroquinacridone and solvent mixture until the alkali metal hydroxide concentration is at least below about 10 parts per 100 parts of water.

5. A method for converting beta crystal phase 6,13-dihydroquinacridone to gamma crystal phase quinacridone comprising oxidizing the dihydroquinacridone with a mild, alkali-stable oxidizing agent selected from the group consisting of nitrobenzene-m-sodium sulfonate, air, and sodium polysulfide in the presence of a mixture of an alkali metal hydroxide, water, and a polar, alkali-stable, water-soluble organic solvent, the proportions of ingredients of said mixture being such that the dihydroquianacridone shows no perceptible solubility in the reaction mixture, and recovering gamma crystal phase quinacridone from the reaction mixture.

6. A method for converting beta crystal phase 6,13-dihydroquinacridone to gamma crystal phase quinacridone comprising oxidizing the dihydroquinacridone with a mild oxidizing agent selected from the group consisting of nitrobenzene-m-sodium sulfonate, air, and sodium polysulfide in the presence of a mixture of sodium hydroxide, water, and a water-soluble alcohol, the alkali being present in amounts of 3–10 parts per 100 parts of water and not greater than 5 parts per 100 parts of total liquid used, and the amount of alcohol being about 35–100 parts per 100 parts of water.

7. The process of claim 6 in which the sodium hydroxide/water/alkanol ratio is 5:100:90.

8. A method for preparing gamma crystal phase quinacridone comprising contacting alpha crystal phase dihydroquinacridone with a mixture of an alkali metal hydroxide, water, and a polar, alkali-stable, water-soluble organic solvent, the alkali metal hydroxide being present in amounts of about 15 to 20 parts per 100 parts of water, and the amount of organic solvent being 300 to 400 parts, diluting the slurry of dihydroquinacridone and solvent mixture with water until the alkali metal hydroxide concentration is at least below 10 parts per 100 parts of water, adding an oxidizing agent selected from the group consisting of nitrobenzene-m-sodium sulfonate, air, and sodium polysulfide, and refluxing the mixture until gamma crystal phase quinacridone is obtained.

References Cited in the file of this patent

UNITED STATES PATENTS

| | | |
|---|---|---|
| 2,821,529 | Struve | Jan. 28, 1958 |
| 2,821,530 | Struve | Jan. 28, 1958 |
| 2,844,484 | Reidinger et al. | July 22, 1958 |
| 2,844,485 | Struve | July 22, 1958 |
| 2,844,581 | Manger et al. | July 22, 1958 |

OTHER REFERENCES

Pendse et al., J. Indian Chem. Soc., vol. 9 (1932) pp. 67–70.